United States Patent [19]

Kim

[11] 4,184,709
[45] Jan. 22, 1980

[54] HATCHBACK STATION WAGON WITH ADJUSTABLE ROOF PANEL

[76] Inventor: Sunyong P. Kim, 535 N. Cahuenga Blvd., Los Angeles, Calif. 90004

[21] Appl. No.: 916,954

[22] Filed: Jun. 19, 1978

[51] Int. Cl.² .............................................. B60P 3/00
[52] U.S. Cl. ................................ 296/137 B; 296/146
[58] Field of Search .......... 296/146, 147, 155, 137 R, 296/137 B, 137 C, 137 E

[56] References Cited

U.S. PATENT DOCUMENTS

| | | | |
|---|---|---|---|
| 2,556,062 | 6/1951 | Buehrig | 296/148 |
| 2,596,903 | 5/1952 | Kropp | 296/137 B |
| 3,542,417 | 11/1970 | Mohs | 296/146 |
| 3,782,776 | 1/1974 | Ormont | 296/137 B |
| 3,833,255 | 9/1974 | Logue | 296/137 B |
| 3,977,720 | 8/1976 | Schreiberg | 296/137 C |
| 4,063,774 | 12/1977 | Hanks | 296/137 E |

*Primary Examiner*—Philip Goodman
*Attorney, Agent, or Firm*—John T. Matlago

[57] ABSTRACT

A hatchback station wagon having a rear cargo space is provided with a rectangular opening on its rear roof portion which is covered by a roof panel hinged at its front end to the roof. The hatchback door of the station wagon is hinged to the rear end of the roof panel which is normally held in its closed position by sliding pins mounted on the bottom rear thereof engaging openings on the rear sides of the rectangular opening. When it is desired to provide a vertical clearance for the cargo space, the sliding side pins are disengaged such that the roof panel can be swung upwardly on its front hinges and folded back against the front portion of the roof with the hatchback door lying thereover.

7 Claims, 9 Drawing Figures

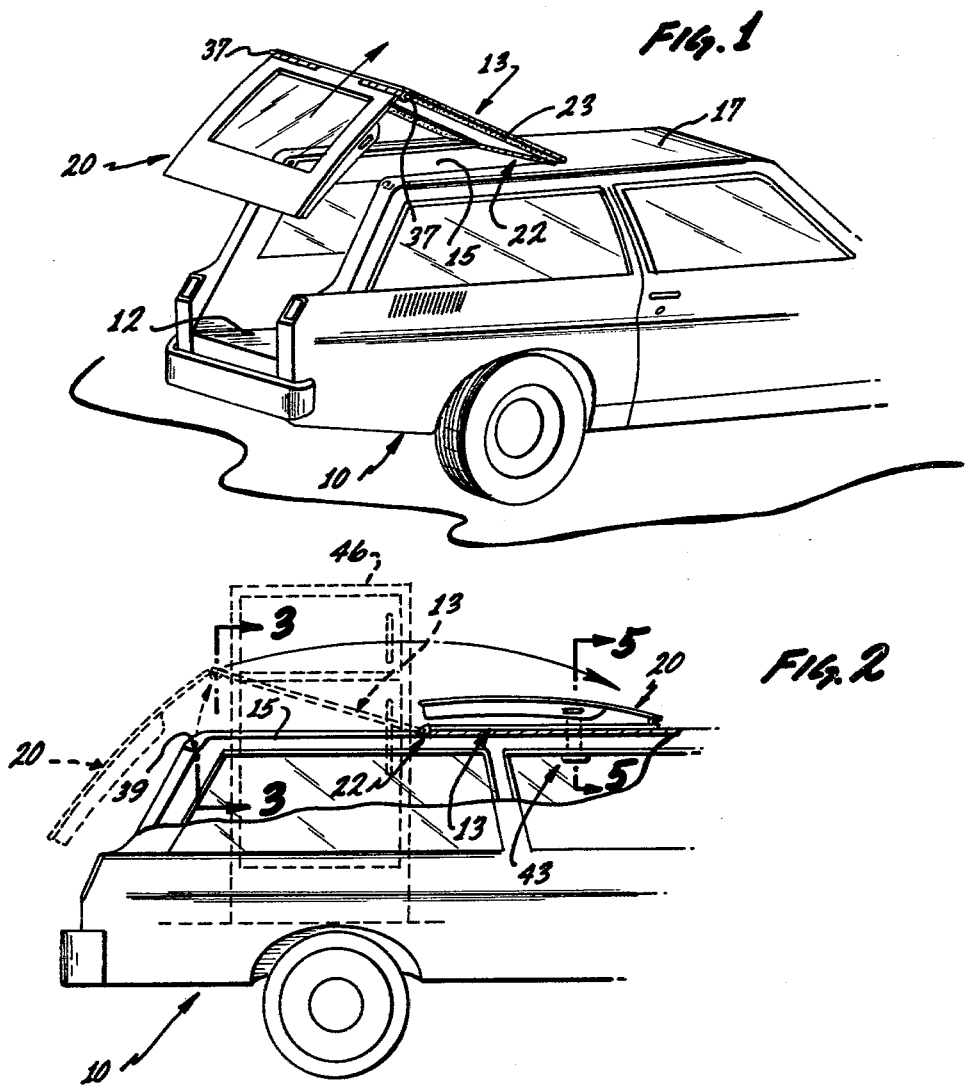
Fig. 1
Fig. 2
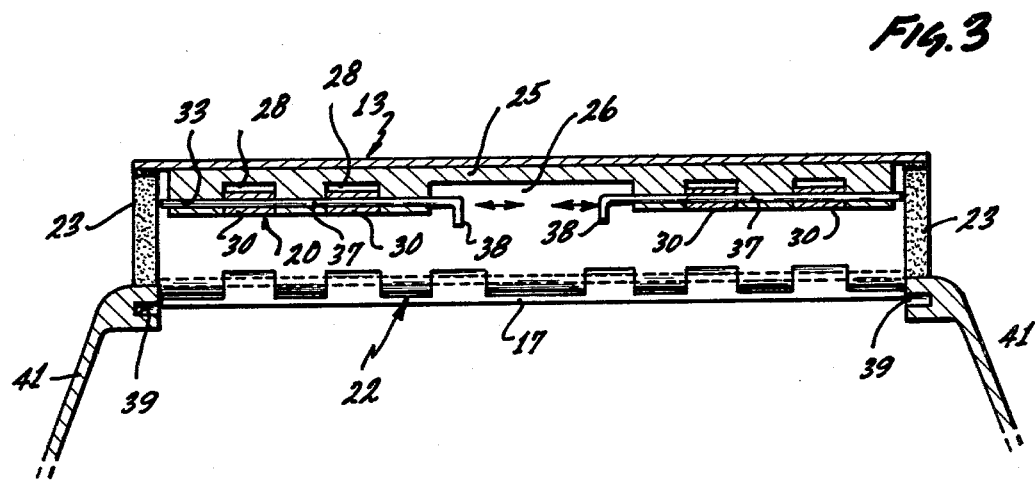
Fig. 3

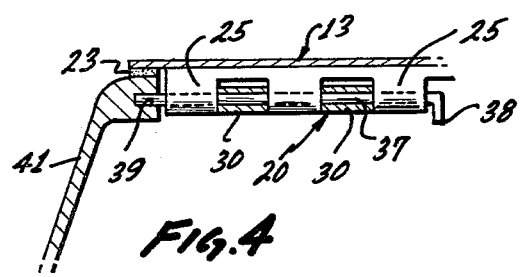
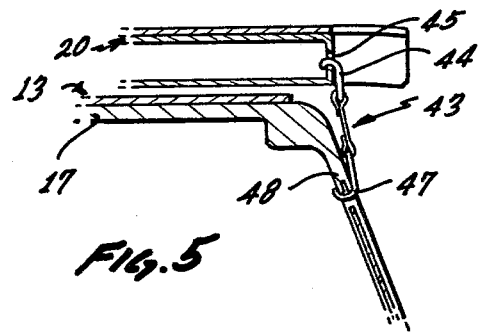
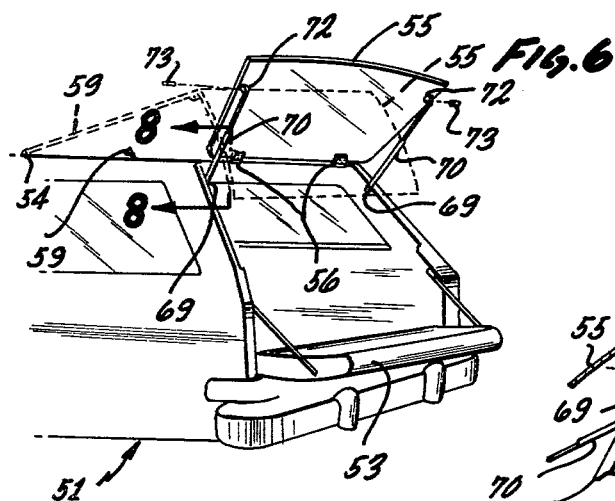
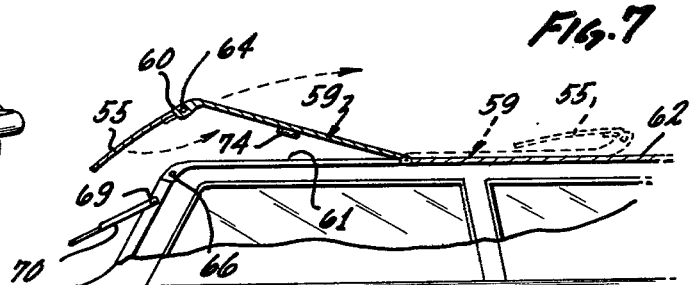
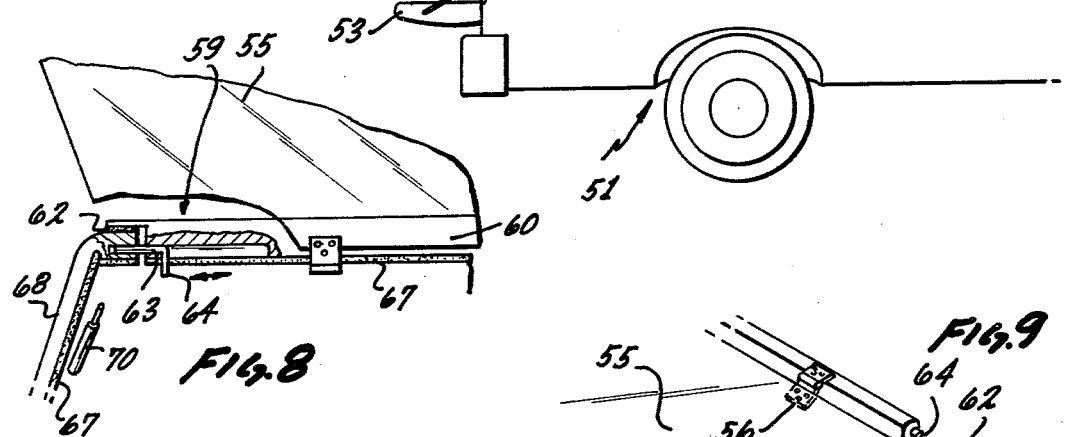
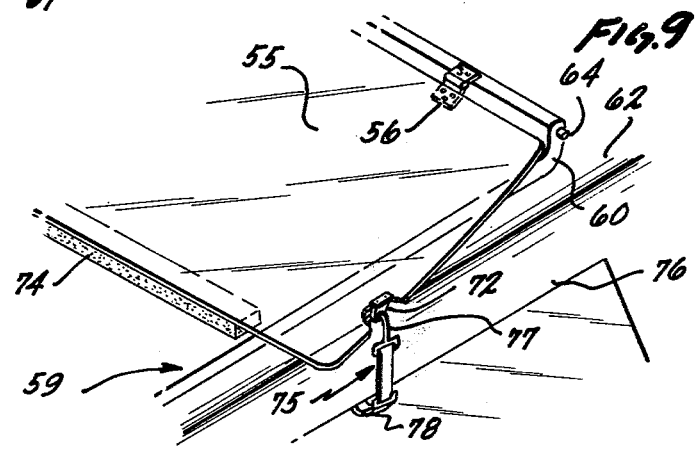

HATCHBACK STATION WAGON WITH ADJUSTABLE ROOF PANEL

BACKGROUND AND SUMMARY OF THE INVENTION

This invention relates to station wagons of the hatchback type and more particularly to such a station wagon having a rear adjustable roof panel which can be opened up to provide a vertical clearance for objects being hauled in the cargo space thereof.

Hatchback station wagons are popular because they provide a cargo space in the rear thereof in which varying size objects can be carried. However, the utility of the hatchback station wagon for such purposes is restricted because of the limited height of its cargo space.

In accordance with the present invention, a hatchback station wagon having a rear cargo space is provided with a rectangular opening in the rear roof portion thereof which is covered by a roof panel. The roof panel is hinged at the front end thereof to the roof and is locked in its position covering the rectangular opening by side sliding pins on its rear which engage holes in the rear sides of the rectangular opening. The hatchback door on the station wagon normally swings upwardly on hinges by which it is joined to the rear of the roof panel. When it is desired to provide a vertical clearance in the cargo space, the side pins are pulled inwardly to release the roof panel thereby enabling it to be swung on its front hinge back over the front roof portion with the hatchback door lying against the underside of the roof panel.

Accordingly, one of the objects of the present invention is to enhance the utility of the cargo space of a hatchback station wagon for hauling purposes.

Another object of the present invention is to provide for opening up the rear roof portion of a hatchback station wagon to provide a vertical clearance for objects placed into the cargo space thereof.

Still another object of the present invention is to provide a hatchback station wagon having an adjustable rear roof panel wherein both the roof panel and the hatchback door which is hinged thereto can be swung upwardly and folded back over the front portion of the roof to provide a vertical clearance opening in the cargo space of the station wagon.

With these and other objects in view, the invention consists of the construction, arrangement and combination of the various parts of the device whereby the objects contemplated are attained, as hereinafter set forth, pointed out in the appended claims and illustrated in the accompanying drawings.

DRAWING SUMMARY

FIG. 1 is a perspective view of a hatchback station wagon embodying the adjustable rear roof panel of the present invention;

FIG. 2 is a side view of the station wagon of FIG. 1 showing the folding action of its hatchback door and rear roof panel to provide a vertical clearance opening for the cargo space on the rear thereof;

FIG. 3 is a view partly in section, as taken along line 3—3 of FIG. 2, showing the side pins of the hinges on the rear of the roof panel disengaged from the rear sides of the rectangular opening;

FIG. 4 is a partial sectional view showing one of the side pins on the rear of the roof panel engaged to the rear sides of the rectangular opening during normal usage of the hatchback door;

FIG. 5 is a partial view taken along line 5—5 in FIG. 2 showing the clamp for holding down the roof panel and hatchback door when in their folded back position as indicated in solid lines in FIG. 2;

FIG. 6 is a rear view of a hatchback station wagon embodying the adjustable roof panel of the present invention wherein the station wagon has a downwardly swinging bottom door and a hinged upwardly swinging hatchback plate glass window;

FIG. 7 illustrates the folding action of the rear roof panel and the hinged hatchback plate glass window to open up the rear portion of the roof;

FIG. 8 is a partial sectional view showing one of the side pins on the rear of the roof panel engaged to the rear side of the rectangular opening during normal usage of the hinged hatchback plate glass window; and FIG. 9 is a partial perspective view of a clamp for holding down the roof panel and the hatchback plate glass window when folded back against the roof.

DESCRIPTION OF THE PREFERRED EMBODIMENTS

Referring to FIG. 1 a hatchback station wagon 10 provided with a rear cargo space 12 is adapted to embody an adjustable rear roof panel 13 in accordance with the present invention. As illustrated in FIG. 1, a rectangular opening 15 is provided on the rear half portion of the roof 17 of the station wagon. The rectangular opening 15 extends from one side of the roof to the other and extends rearwardly so as to be a continuation of the opening normally covered by the hatchback door 20.

The roof panel 13 which covers the rectangular opening 15 is provided with a hinge 22 on the front thereof by which it is joined to the roof. The sides of the roof panel 13 which overlap the sides of the rectangular opening 15 are provided with strips 23 of sealing material. The lower rear end of the roof panel 13 has a projecting transverse member 25 secured thereto. The member 25 has a recessed central portion 26 and a pair of spaced cutouts 28 on each of the side portions thereof. A hole 33 is formed along the length of each of the side portions of member 25. The hatchback door 20 has a pair of spaced projections 30 on the upper end thereof with holes 35. The projections 30 on the upper side of the hatchback door 20 mate with the cutouts 28 on the rear of the roof panel 13 such that their holes 33 and 35 are aligned. A pintle or side pin 37 is then inserted into the aligned holes 33 and 35 on each side of the member 25. The side pins 37 serve to hinge the upper end of the hatchback door 20 to the rear of the roof panel 13. As shown in FIG. 3, the side pins 37 can be positioned such that they are disengaged from pivot openings 39 on the rear sides of the rectangular opening 15 or they can be positioned, as shown in FIG. 4, such that they engage the pivot openings 39 on the rear sides of the rectangular opening 15.

The roof panel 13 is normally locked in its position covering the rectangular opening 15 in the roof 17 by engaging the outer ends of the side pins 37 in the pivot openings 39 such that when it is desired to gain access to the cargo space 12 on the rear of the station wagon 10, the hatchback door 20 can be swung in a normal fashion upwardly on the side pins 37.

Now then, when it is desired to open up the roof panel 13 to provide a vertical clearance in the cargo space of the hatchback station wagon, the hatchback door 20 is first opened by swinging it upwardly on side pins 37. The side pins 37 are then pulled upwardly by use of their bent ends 38 such that their outer ends are disengaged from the pivot openings 39 on the rear sides of the rectangular opening 15.

This enables the roof panel 13 to be swung upwardly on its front hinge 22 by which it is connected to the roof 17. The hatchback door 20 is then swung back on side pins 37 so as to lie against the underside of the roof panel 13 and then the assembly is further swung about the panel front hinge 22 such that the top surface of the roof panel 13 overlies the front portion of roof 17. As illustrated in FIG. 5, the assembly is secured by clamps 43, each clamp having an upper hook 44 which engages an opening 45 on the inner side wall of the hatchback door 20 and a lower hook 47 which engages the lower edge of the front window frame 48. With the rear rectangular opening 15 on the roof of the hatchback station wagon 10 opened up, an upright refrigerator 46, for example, indicated in dashed lines in FIG. 2, can be placed into the rear cargo space thereof with its upper end portion extending above the level of the roof 17.

Reference will next be made to FIG. 6 which shows a rear perspective view of a hatchback type station wagon 51 having a hatchback plate glass window 55 and a roof panel 59 which covers a rectangular opening 61 on the rear half portion of the roof 62 thereof. The roof panel 59 is joined to the roof by front hinge 54. The sides of the roof panel 59 are sealed by the strips 67 of sealing material. It should be noted that when the hatchback plate glass window 55 is swung down in its closed position against frame 68 its sides contact strips 67 of sealing material.

The roof panel 59 is formed with an angularly projecting rear end 60 to which the upper edge of the hatchback plate glass window 55 is joined by a pair of spaced hinge members 56. The rear end 60 is provided with an elongated hole 63 along the length of each side portion thereof. A recess is provided inwardly of each of the elongated holes 63 to facilitate the inserting of a sliding side pin 64 therein such that its outer end is aligned with a hole 66 on the rear side of the rectangular opening 61. The outer ends of the side pins 64 normally extend into the side holes 66 of rectangular opening 61 such as to hold or lock the roof panel 59 in its normal position of covering the rear rectangular opening 61 in the roof 62. It should now be clearly understood that the hatchback plate glass window 55 can be opened independently of the bottom gate 53 by swinging it about its hinge members 56 by which it is attached to the rear of the roof panel 59. The upwardly swinging of the hatchback plate glass window 55 may be effected by a pair of side gas cylinders 70 having inner ends 69 permanently joined to the side frames 68 and having outer ends joined by pins 73 to eyebolts 72 secured to the sides of the hatchback plate glass window 55.

When it is desired to open up the roof panel 59, the outer ends of the gas cylinder hinges 70 are first disconnected by removing the pins 73 from eyehooks 72. After the outer ends of the sliding pins 64 have been disengaged from the openings on the rear sides of rectangular opening 61, the hatchback plate glass window 55 can be folded back against the underside of the roof panel 59 which, in turn, is folded back on its front hinge 54 so as to lie against the front portion of the roof 62. A strip of rubber cushioning 74 is provided on the underside of the roof panel 59 against which the lower edge of the plate glass window 55 seats when in its folded position. As illustrated in FIG. 9, each eyehook 72 secured on the lower side of the plate glass window 55 can be used to engage the hook 77 on the upper end of a clamp 75 whose lower end 78 engages the underside of the front window frame 76 to thereby secure the plate glass window 55 and the roof panel 59 in the open position on the roof.

While the invention shown and described herein has been adapted to fulfill the objects and advantages previously mentioned as desirable, it is to be understood that the invention is not limited to the specific features shown and described but that the means and configuration herein disclosed are susceptible of modification in form, proportion and arrangements of parts without departing from the principle involved or sacrificing any of its advantages and the invention is therefore claimed in embodiments of various forms all coming within the scope of the claims which follow.

What is claimed is:

1. In a hatchback station wagon having a rear cargo space, a hatchback door and a roof,
   said roof provided with a rectangular opening on the rear half portion thereof,
   a roof panel normally covering said rectangular opening and hinged on the front thereof to the roof,
   said hatchback door hinged at its top to the rear of said roof panel, and
   means for engaging or disengaging the rear of the roof panel to the rear sides of said rectangular opening,
   whereby when the rear of said roof panel is engaged said hatchback door can be swung upwardly on the hinge on the rear of the roof panel in a normal fashion to gain access to said cargo space, and
   whereby when the rear of said roof panel is disengaged said roof panel can be swung upwardly on the hinge on the front thereof and folded back against the front portion of the roof while the hatchback door can be swung downwardly on the hinge on the rear of said roof panel and folded back against the roof panel to thereby provide a vertical clearance opening above said cargo space.

2. In a hatchback station wagon as defined in claim 1 wherein said means for engaging or disengaging the rear of the roof panel to the back sides of said rectangular opening include side pins slideably mounted in transverse holes provided on the rear of the roof panel.

3. In a hatchback station wagon as defined in claim 2 wherein said hinge on the rear of said roof panel includes said side pins.

4. In a hatchback station wagon having a rear cargo space, a hatchback door and a roof,
   said roof provided with a rectangular opening in the rear portion thereof,
   a roof panel normally covering said rectangular opening,
   a front hinge for joining the front of said roof panel to the front of said rectangular opening, and
   a rear hinge for joining the rear of said roof panel to the top of said hatchback door, said rear hinge including side pins slideably mounted to engage or disengage pivot openings on the rear sides of said rectangular opening,
   whereby when said side pins are engaged said hatchback door can be swung upwardly on said rear hinge in a normal manner to gain access to said cargo space, and whereby when side pins are disengaged said roof panel can be swung upwardly on said front hinge and folded back against the front portion of the roof while the hatchback door can be swung downwardly on said rear hinge and folded back against the roof panel to thereby provide a vertical clearance opening above said cargo space.

5. In a hatchback station wagon having a rear cargo space, a hatchback door in the form of a plate glass, and a roof, wherein the improvement comprises:
   said roof provided with a rectangular opening on the rear half portion thereof;
   a roof panel normally covering said rectangular opening and hinged on the front thereof to the roof;
   said hatchback door hinged at its top to the rear of said roof panel; and
   means for engaging or disengaging the rear of the roof panel to the rear sides of said rectangular opening including side pins slideably mounted in transverse holes provided on the rear of said roof panel;
   whereby when the rear of said roof panel is engaged said hatchback door can be swung upwardly on the hinge on the rear of the roof panel in a normal fashion to gain access to said cargo space; and
   whereby when the rear of said roof panel is disengaged said roof panel can be swung upwardly on the hinge on the front thereof and folded back against the front portion of the roof while the hatchback door can be swung downwardly on the hinge on the rear of said roof panel and folded back against the roof panel to thereby provide a vertical clearance opening above said cargo space.

6. In a hatchback station wagon having a rear cargo space, a hatchback door and a roof, wherein the improvement comprises:
   said roof provided with a rectangular opening in the rear portion thereof;
   a roof panel normally covering said rectangular opening,
   a front hinge for joining the front of said roof panel to the front of said rectangular opening; and
   a rear hinge for joining the rear of said roof panel to the top of said hatchback door, said rear hinge including side pins slideably mounted to engage or disengage pivot openings on the rear sides of said rectangular opening;
   wherein said roof panel includes a transverse projection on the rear thereof having cutouts on side portions thereof, the top of said hatchback door has projections on side portions thereof which interfit in the cutouts on the side portions of said transverse projection, said respective interfitted side portions have elongated holes therethrough, and said side pins are slideably mounted in the elongated holes in the respective interfitted side portions;
   whereby when said side pins are engaged said hatchback door can be swung upwardly on said rear hinge in a normal manner to gain access to said cargo space; and
   whereby when said side pins are disengaged said roof panel can be swung upwardly on said front hinge and folded back against the front portion of the roof while the hatchback door can be swung downwardly on said rear hinge and folded back against the roof panel to thereby provide a vertical clearance opening above said cargo space.

7. In a hatchback station wagon having a rear cargo space, a hatchback door and a roof, wherein the improvement comprises:
   said roof provided with a rectangular opening in the rear portion thereof;
   a roof panel normally covering said rectangular opening;
   a front hinge for joining the front of said roof panel to the front of said rectangular opening;
   a rear hinge for joining the rear of said roof panel to the top of said hatchback door, said rear hinge including side pins slideably mounted to engage or disengage pivot openings on the rear sides of said rectangular opening;
   whereby when said side pins are engaged said hatchback door can be swung upwardly on said rear hinge in a normal manner to gain access to said cargo space; and
   whereby when said side pins are disengaged said roof panel can be swung upwardly on said front hinge and folded back against the front portion of the roof while the hatchback door can be swung downwardly on said rear hinge and folded back against the roof panel to thereby provide a vertical clearance opening above said cargo space; and
   wherein clamping means are provided for clamping said hatchback door and said roof panel when folded down against the front portion of the roof.

* * * * *